US012352965B2

(12) United States Patent
Kalkgruber et al.

(10) Patent No.: US 12,352,965 B2
(45) Date of Patent: *Jul. 8, 2025

(54) AR SYSTEM BENDING CORRECTION

(71) Applicant: Snap Inc., Santa Monica, CA (US)

(72) Inventors: Matthias Kalkgruber, Vienna (AT); Tiago Miguel Pereira Torres, Vienna (AT); Weston Welge, Boulder, CO (US); Ramzi Zahreddine, Denver, CO (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,790

(22) Filed: Apr. 23, 2024

(65) Prior Publication Data

US 2024/0280814 A1 Aug. 22, 2024

Related U.S. Application Data

(63) Continuation of application No. 17/937,950, filed on Oct. 4, 2022, now Pat. No. 11,988,833.

(51) Int. Cl.
*G02B 27/01* (2006.01)
*G02B 27/00* (2006.01)
*G06T 19/00* (2011.01)

(52) U.S. Cl.
CPC ....... *G02B 27/017* (2013.01); *G02B 27/0093* (2013.01); *G06T 19/006* (2013.01); *G02B 2027/0178* (2013.01)

(58) Field of Classification Search
CPC . G02B 27/0101; G02B 27/0172; G06F 3/011; G06F 3/013; G06T 15/00; G06T 19/006; G06T 3/40; G06T 5/002; G06T 7/50; G06T 2200/24
See application file for complete search history.

(56) References Cited

U.S. PATENT DOCUMENTS

| 11,644,693 B2* | 5/2023 | Howell | G02C 5/001 |
| | | | 351/158 |
| 2014/0361185 A1 | 12/2014 | Howell et al. | |
| 2020/0013228 A1 | 1/2020 | Lee et al. | |

(Continued)

FOREIGN PATENT DOCUMENTS

WO WO-2024076571 A1 4/2024
WO WO-2024177930 A1 8/2024

OTHER PUBLICATIONS

"U.S. Appl. No. 17/937,950, Non Final Office Action mailed Sep. 14, 2023", 11 pgs.

(Continued)

*Primary Examiner* — Nelson M Rosario
(74) *Attorney, Agent, or Firm* — Schwegman Lundberg & Woessner, P.A.

(57) ABSTRACT

A system for deformation or bending correction in an Augmented Reality (AR) system. Sensors are positioned in a frame of a head-worn AR system to sense forces or pressure acting on the frame by temple pieces attached to the frame. The sensed forces or pressure are used in conjunction with a model of the frame to determine a corrected model of the frame. The corrected model is used to correct video data captured by the AR system and to correct a video virtual overlay that is provided to a user wearing the head-worn AR system.

20 Claims, 13 Drawing Sheets

(56) References Cited

U.S. PATENT DOCUMENTS

| | | |
|---|---|---|
| 2020/0294474 A1 | 9/2020 | Zurbrick et al. |
| 2021/0405959 A1 | 12/2021 | Lovitt |
| 2022/0099972 A1 | 3/2022 | Birklbauer et al. |
| 2022/0103802 A1 | 3/2022 | Heger et al. |
| 2022/0155600 A1 | 5/2022 | Birklbauer et al. |
| 2022/0270336 A1 | 8/2022 | Ha et al. |
| 2022/0374505 A1 | 11/2022 | Katz |
| 2023/0035458 A1 | 2/2023 | Ju et al. |
| 2023/0206575 A1 | 6/2023 | Da Silva et al. |
| 2024/0111156 A1 | 4/2024 | Kalkgruber et al. |
| 2024/0280355 A1 | 8/2024 | Kalkgruber et al. |

OTHER PUBLICATIONS

"U.S. Appl. No. 17/937,950, Notice of Allowance mailed Jan. 18, 2024", 11 pgs.

"U.S. Appl. No. 17/937,950, Response filed Dec. 14, 2023 to Non Final Office Action mailed Sep. 14, 2023", 8 pgs.

"International Application Serial No. PCT/US2023/034375, International Search Report mailed Dec. 12, 2023", 3 pgs.

"International Application Serial No. PCT/US2023/034375, Written Opinion mailed Dec. 12, 2023", 10 pgs.

U.S. Appl. No. 17/937,950, filed Oct. 4, 2022, AR System Bending Correction.

U.S. Appl. No. 18/172,874, filed Feb. 22, 2023, Joint Bending Estimation.

"International Application Serial No. PCT/US2024/016369, International Search Report mailed Jun. 13, 2024", 3 pgs.

"International Application Serial No. PCT/US2024/016369, Written Opinion mailed Jun. 13, 2024", 4 pgs.

* cited by examiner

AR SYSTEM BENDING CORRECTION

PRIORITY CLAIM

This application is a continuation of U.S. patent application Ser. No. 17/937,950, filed on Oct. 4, 2022, which is hereby incorporated by reference in its entirety.

TECHNICAL FIELD

The present disclosure relates generally to user interfaces and more particularly to user interfaces used in augmented and virtual reality.

BACKGROUND

A head-worn device may be implemented with a transparent or semi-transparent display through which a user of the head-worn device can view a surrounding environment or real-world scene. Such devices enable a user to see through the transparent or semi-transparent display to view the real-world scene, and to also see objects (e.g., virtual objects such as a rendering of a 2D or 3D graphic model, images, video, text, and so forth) that are generated for display to appear as a part of, and/or overlaid upon, the real-world scene. This is typically referred to as "augmented reality" or "AR." A head-worn device may additionally completely occlude a user's visual field and display a virtual environment through which a user may move or be moved. This is typically referred to as "virtual reality" or "VR." In a hybrid form, a view of the real-world scene is captured using imaging devices, and then that view is displayed along with augmentation to the user on displays that occlude the user's eyes. As used herein, the term AR refers to augmented reality, virtual reality and any of hybrids of these technologies unless the context indicates otherwise.

A user of the head-worn device may access and use computer software applications to perform various tasks or engage in an entertaining activity. Performing the tasks or engaging in the entertaining activity may require entry of various commands into the head-worn device. Therefore, it is desirable to have a mechanism for entering commands.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
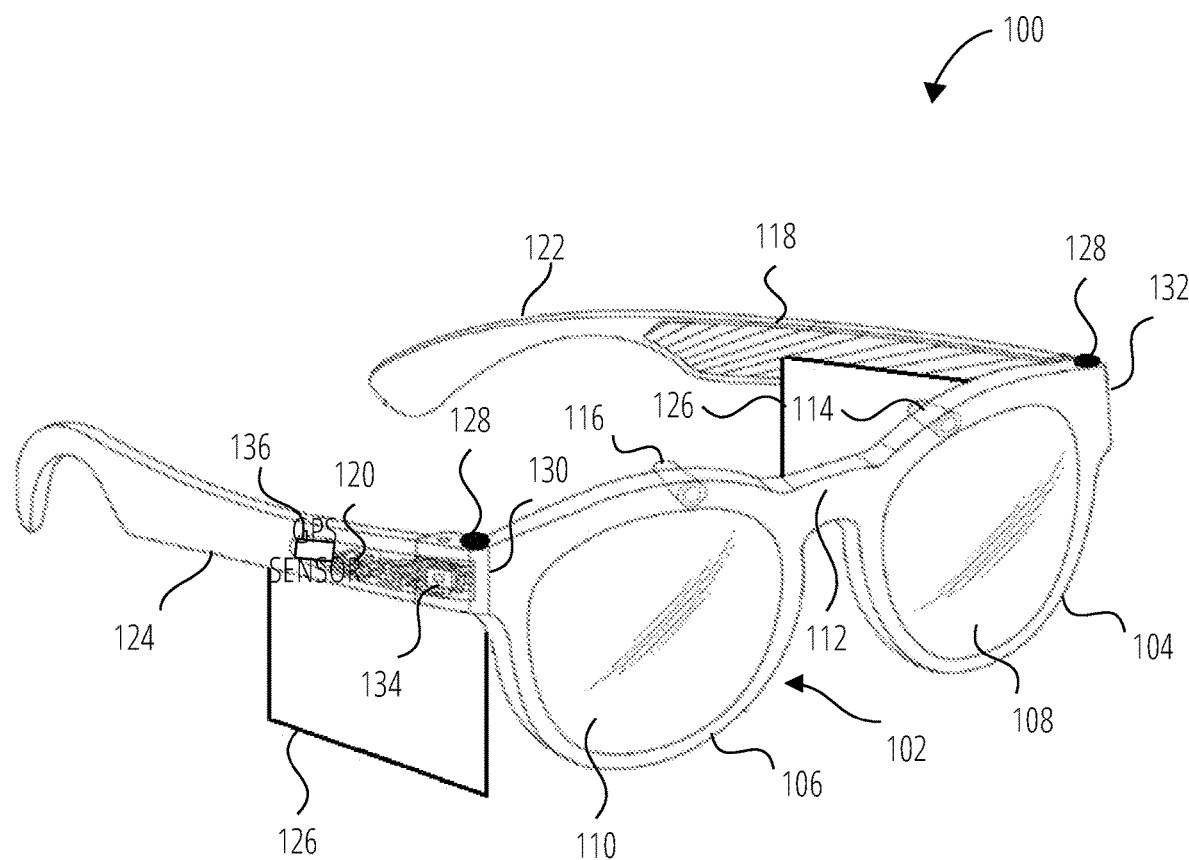
FIG. 1 is a perspective view of a head-worn device, in accordance with some examples.

Knowledge of spatial relationships of system components of a head-worn AR apparatus is useful for generating accurate virtual overlays for AR experiences. Ergonomic and visually appealing frame designs for a head-worn AR apparatus provide lightweight glasses. However, such designs may be less rigid and this may lead to spatial relationships between different components of the head-worn AR apparatus, such as displays, imaging devices, inertial measurement units, and projectors, changing over time. Such relationships may also change during normal operation by a user simply putting on the head-worn AR apparatus, walking or touching a frame of the head-worn apparatus. This may result in incorrect sensing of the surrounding world (e.g., stereo-depth estimation) which leads to unrealistic AR experiences. The spatial relationships between components are determined during a factory calibration that allows accurate augmentations created for AR experiences; however, if the spatial relationships between the components change during operation, the factory calibration becomes invalid, and the quality of the augmentation is decreased.

In some examples, one or more force or pressure sensors are mounted on temple hinges of a head-worn AR system to measure forces acting on a frame of the head-worn AR system. This allows direct measurement of AR system frame dynamics to infer spatial relationships. This allows compact integration of sensors, making more flexible and ergonomic frame designs possible, while maintaining close to optimal AR experiences.

In some examples, an AR system includes: a frame; one or more sensors operable to sense forces acting on the frame; one or more imaging devices mounted to the frame; a pose component that measures a pose and location of the frame; and an optical engine mounted to the frame. During operation, the AR system captures sensor data of the forces acting on the frame and generates a corrected frame model of the frame based on the sensor data and a physical model of the frame. The AR system captures tracking video frame data of one or more physical objects in a real-world scene being viewed or interacted with by a user of the AR system using the imaging devices. The AR system captures pose and location data using the pose component while the AR system is capturing the tracking video frame data. The AR system generates tracking data based on the corrected frame model, the tracking video frame data, and the pose and location data.

In some examples, the pose component includes one or more Inertial Measurement Units (IMUs) used to determine pose and location data.

In some examples, the pose component includes a Global Positioning System (GPS) sensor and one or more IMUs. The AR system combines data from the GPS sensor and the one or more IMUs to generate the pose and location data.

In some examples, the pose component includes one or more IMUs used to generate pose and location data. The AR system generates tracking data based on the corrected frame model and the pose and location data without using tracking video frame data.

In some examples, the AR system generates virtual overlay data based on the tracking data, generates virtual overlay video frame data based on the corrected frame model and the virtual overlay data, and provides, using the optical engine, a virtual overlay to the user based on the virtual overlay video frame data.

Other technical features may be readily apparent to one skilled in the art from the following figures, descriptions, and claims.

FIG. 1 is a perspective view of a head-worn AR system (e.g., glasses 100 of FIG. 1), in accordance with some examples.

As used herein, directional terms such as, but not limited to, "up", "upper", "down", "lower", "vertical", "horizontal", "lateral", "left", "right", "forward", and "backward" are to be interpreted from a perspective of a user wearing a head-worn AR system such as glasses 100 unless an alternative meaning is indicated.

The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or left temple piece 122 and a right arm or right temple piece 124. In some examples the frame 102 can be formed from a single piece of material so as to have a unitary or integral construction.

The glasses 100 can include a computing system, such as a computer 120, which can be of any suitable type so as to be carried by the frame 102 and, in one or more examples, of a suitable size and shape, so as to be partially disposed in one of the left temple piece 122 or the right temple piece 124. The computer 120 can include multiple processors, memory, and various communication components sharing a common power source. As discussed below, various components of the computer 120 may comprise low-power circuitry, high-speed circuitry, and a display processor. Various other examples may include these elements in different configurations or integrated together in different ways. Additional details of aspects of the computer 120 may be implemented as illustrated by the data processor 902 discussed below.

The computer 120 additionally includes a battery 118 or other suitable portable power supply. In some examples, the battery 118 is disposed in a left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 includes one or more imaging devices such as, but not limited to, a first or left imaging device 114 and a second or right imaging device 116. In some examples, one or more imaging devices of the glasses 100 comprise an imaging sensor and an optics assembly, such as, but not limited to a camera or the like. In some examples, the imaging sensor senses electromagnetic radiation in the visible light spectrum. In some examples, the imaging sensor senses electromagnetic radiation in the infrared spectrum. In some examples, the glasses 100 further include one or more light emitting sources, such as Light Emitting Diodes (LEDs). In some examples, one or more LEDs of the AR system operate in the infrared range of light frequencies.

In some examples, one or more imaging devices of the glasses 100 include one or more Laser Imaging, Detection, and Ranging (LIDAR) devices.

In one or more examples, the glasses 100 include any number of input sensors or other input/output devices in addition to the left imaging device 114 and the right imaging device 116. Such sensors or input/output devices can additionally include biometric sensors, location sensors, motion sensors, and so forth.

In some examples, the left imaging device 114 and the right imaging device 116 provide video frame data for use by the glasses 100 to extract 3D information from a real-world scene being viewed by a user of the glasses 100.

The glasses 100 may also include a touchpad 126 mounted to or integrated with one or both of the left temple piece 122 and right temple piece 124. The touchpad 126 is generally vertically arranged, approximately parallel to a user's temple in some examples. As used herein, generally vertically aligned means that the touchpad is within a range of being vertical to being more vertical than horizontal. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

The glasses 100 may further include one or more IMUs 134 configured to measure a physical orientation, such as a pose and location, of the frame 102 and generate IMU data including the measured pose and location. In some examples, the IMU 134 is operable to measure a rotation angle of the frame 102 around a pitch rotational axis, a roll rotation axis, and a yaw rotational axis. In some examples, the IMU 134 is operable to measure a rotational movement of the frame 102 around the pitch rotational axis, the roll rotation axis, and the yaw rotational axis as well as translational movement of the frame 102 within a 3D space such as the real-world scene.

The glasses 100 may further include a GPS sensor 136 configured to receive and process global positioning signals to determine a physical location of the frame 102 and generate GPS location data based on the physical location.

Figure 2:
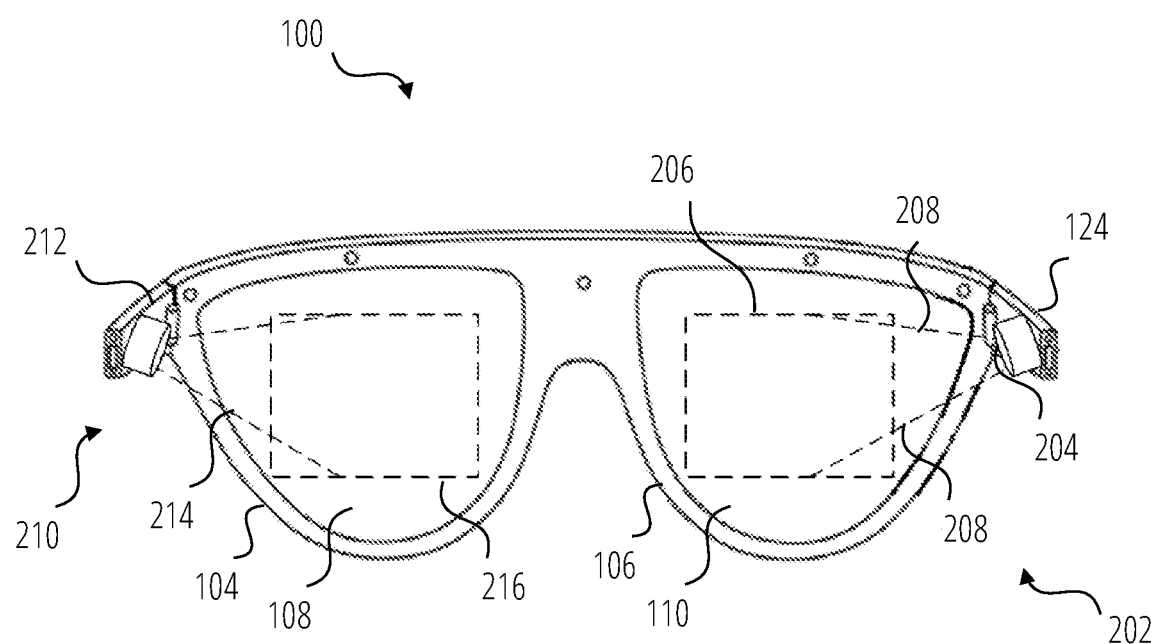
FIG. 2 illustrates a further view of the head-worn device of FIG. 1, in accordance with some examples.

FIG. 2 illustrates the glasses 100 from the perspective of a user wearing the glasses 100. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the right near eye display 206 and left near eye display 216 are waveguides. The waveguides include reflective or diffractive structures (e.g., gratings and/or optical elements such as mirrors, lenses, or prisms). Light 208 emitted by the right projector 204 encounters the diffractive structures of the waveguide of the right near eye display 206, which directs the light towards the right eye of a user to provide an image on or in the right optical element 110 that overlays the view of the real-world scene seen by the user. Similarly, light 214 emitted by the left projector 212 encounters the diffractive structures of the waveguide of the left near eye display 216, which directs the light towards the left eye of a user to provide an image on or in the left optical element 108 that overlays the view of the real-world scene seen by the user. The combination of a GPU, the forward optical assembly 202, the left optical element 108, and the right optical element 110 provide an optical engine of the glasses 100. The glasses 100 use the optical engine to generate an overlay of the real-world scene view of the user including display of a user interface to the user of the glasses 100.

It will be appreciated however that other display technologies or configurations may be utilized within an optical engine to display an image to a user in the user's field of view. For example, instead of a right projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g. client device 926 illustrated in FIG. 9), and/or hand movements, locations, and positions detected by the glasses 100.

In some examples, the glasses 100 are operably connected to a client device, such as a computer, smartphone, and the like, that provides additional computational resources that provide additional functionality to the glasses 100. For example, the glasses 100 recognize simple user interactions of a user but utilize the computational resources of the client device to recognize more complicated interactions such as swiping gestures on a touchscreen or hand gestures captured by an imaging device.

Figure 3A:
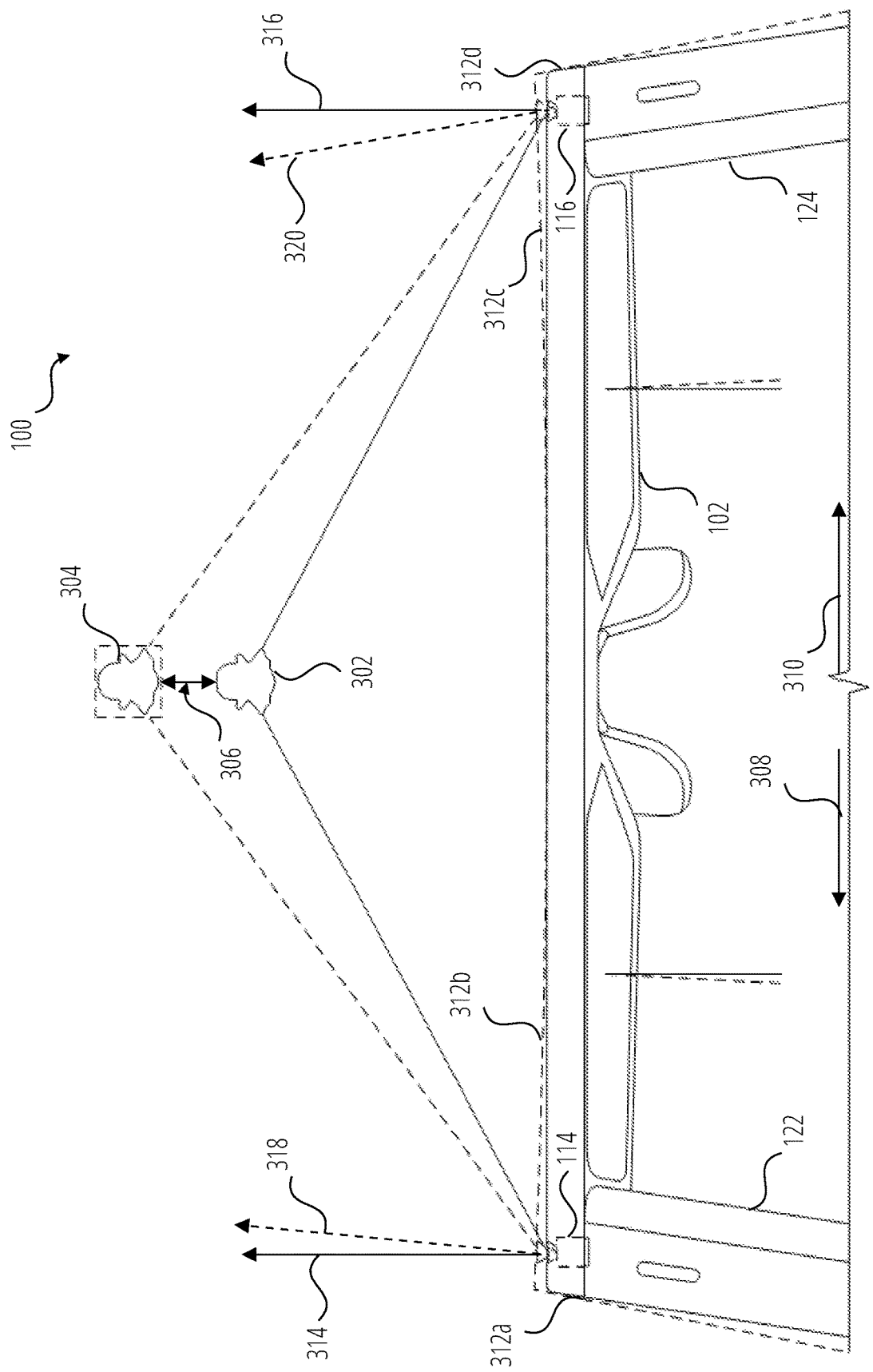
FIG. 3A illustrates misalignment errors resulting from a yaw bending of a head-worn AR system in response to lateral forces acting on a frame of the head-worn AR system, according to some examples.
Figure 3B:
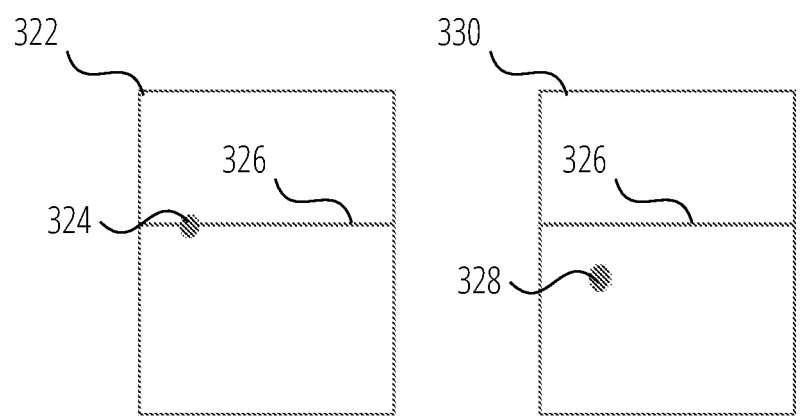
FIG. 3B illustrates a misalignment error caused by pitch movement of a head-worn AR system, according to some examples.

FIG. 3A and FIG. 3B illustrate depth misalignment errors resulting from yaw bending and pitch movement of a head-worn AR system, such as glasses 100, in response of lateral and vertical forces acting on a frame of the head-worn AR system, according to some examples. A head-worn AR system, such as glasses 100, experiences optical misalignment errors caused by a frame 102 of the head-worn AR system deforming or bending when worn by a user. When a user places the head-worn AR system on their head, the temple pieces, such as left temple piece 122 and right temple piece 124, are strained by opposing lateral forces 308 and 310, bending the frame 102 along its length, herein termed "yaw bending", as indicated by bending lines 312a, 312b, 312c, and 312d. In addition, when the glasses 100 experience a vertical force on one or both of the temple pieces of the glasses 100, the glasses 100 are subject to a pitch movement. The yaw bending and the pitch movement can lead to misalignment errors for the optical components of the AR glasses 100. These misalignment errors can lead to tracking errors when tracking data is generated by the AR system and to misalignment between a virtual overlay being provided to the user by the AR system and physical objects and features of a real-world scene being viewed by the user while wearing the head-worn AR system.

Yaw bending may cause the left imaging device 114 and the right imaging device 116 to experience yaw motions. The yaw motions may cause a left optical axis 314 of the left imaging device 114 to become misaligned, as indicated by misaligned left optical axis 318. The yaw motions may also cause a right optical axis 316 of the right imaging device 116 to become misaligned, as indicated by misaligned right optical axis 320. When video frame data of the imaging devices are used to stereoscopically determine a location of a physical feature 302 in a real-world scene, the system incurs a depth or Z error 306 in a Z axis as the physical feature 302 is determined to be at a different location, and thus appears as an apparent physical feature 304, when the AR system generates tracking data of features in the real-world scene. In a similar manner, when a virtual object of a virtual overlay of an AR experience is rendered in video frame data and provided to a user of the head-worn AR system, the user will experience a misalignment of the provided virtual object with the real-world scene.

In a correctly aligned video frame 322 of a virtual overlay, an AR system correctly displays a virtual object 324 in alignment with a real-world scene feature 326. A misaligned video frame 330 causes the AR system to display a virtual object 328 in an incorrect location in reference to the real-world scene feature 326.

Figure 4:
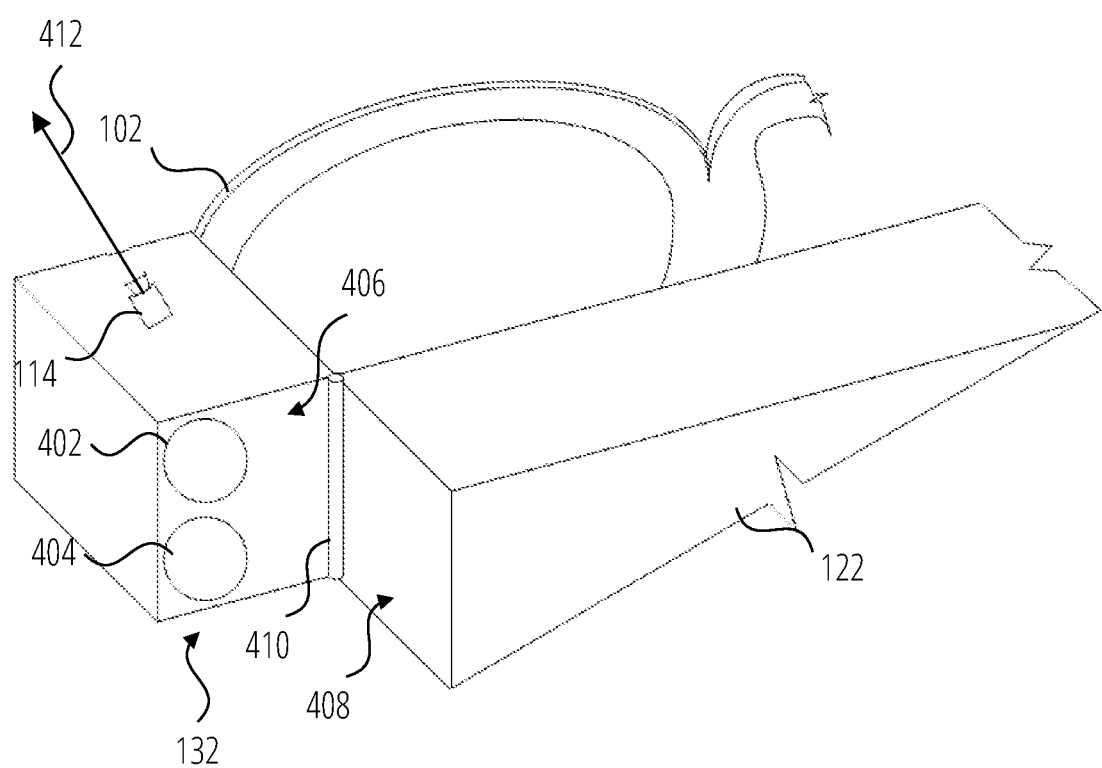
FIG. 4 is an illustration of a sensor arrangement on a frame of a head-worn AR system according to some examples.

FIG. 4 is an illustration of a sensor arrangement on a frame 102 of glasses 100, according to some examples. The frame 102 includes a forward-facing left imaging device 114 having an optical axis 412 projecting forward from the left imaging device 114. The frame 102 is attached to a left temple piece 122 by a left hinge spine 410 forming a left hinge 132 where the frame 102 acts as a first leaf or frame hinge leaf of the left hinge 132 and the left temple piece 122 acts as a second leaf or temple hinge leaf of the left hinge 132.

One or more sensors, such as upper sensor 402 and a lower sensor 404, are mounted at a location in a left outer portion of the frame 102 and have one or more respective sensing surfaces aligned with a frame hinge leaf surface 406 such that, when the left hinge 132 is closed, a temple hinge leaf surface 408 of the left temple piece 122 impinges on the respective sensing surfaces of the upper sensor 402 and the lower sensor 404 and applies force or pressure on the lower sensor 404 and the upper sensor 402. In some examples, at least two sensors are used. In some examples, the at least two sensors are mounted in a vertically spaced apart arrangement.

In some examples, the temple hinge leaf surface 408 includes respective one or more protuberances that impinge on the sensing surfaces of the one or more sensors. In some examples, one or more sensing surfaces of the one or more sensors are convex. In some examples, an outermost portion of one or more sensing surfaces of one or more sensors extend beyond the frame hinge leaf surface 406.

In some examples, one or more sensors, such as an upper sensor and a lower sensor, are mounted in the left temple piece 122 and have one or more respective sensing surfaces aligned with a temple hinge leaf surface 408 such that, when the left hinge 132 is closed, one or more portions of a frame hinge leaf surface 406 of the left temple piece 122 impinges on respective sensing surfaces of the upper sensor and the lower sensor and applies force or pressure on the one or more sensors. In some examples, the frame hinge leaf surface 406 includes respective one or more protuberances that impinge on sensing surfaces of the one or more sensors mounted in the left temple piece 122. In some examples, one or more sensing surfaces of the one or more sensors are convex. In some examples, an outermost portion of one or more sensing surfaces of the one or more sensors extend beyond the temple hinge leaf surface 408.

In some examples, a right outer portion of the frame 102 includes a forward-facing right imaging device 116 having an optical axis projecting forward from the right imaging device 116. (See FIG. 2 and FIG. 3A). The frame 102 is attached to a right temple piece 124 by a right hinge spine (not shown) forming a right hinge 130 where the frame 102 acts as a first leaf or frame hinge leaf of the right hinge 130 and the right temple piece 124 acts as a second leaf or temple hinge leaf of the right hinge 130. One or more sensors (not shown) are mounted at a location in a right outer portion of the frame 102 and have one or more respective sensing surfaces aligned with a frame hinge leaf surface (not shown) such that, when the right hinge 130 is closed, a temple hinge leaf surface (not shown) of the right temple piece 124 impinges on the respective sensing surfaces of the one or more sensors and applies force or pressure on the one or more sensors. In some examples, the temple hinge leaf surface includes respective one or more protuberances that impinge on the respective sensing surfaces of the one or more sensors. In some examples, at least two sensors are used. In some examples, the at least two sensors are mounted in a vertically spaced apart arrangement.

In some examples, one or more sensors, such as an upper sensor and a lower sensor, are mounted in the right temple piece 124 and have one or more respective sensing surfaces aligned with a temple hinge leaf surface such that, when the right hinge 130 is closed, one or more portions of a frame hinge leaf surface of the frame 102 impinges on respective sensing surfaces of the one or more sensors and applies force or pressure on the one or more sensors.

In some examples, one or more sensors are mounted in the right temple piece 124 and/or the left temple piece 122 of the glasses 100 and one or more sensors are mounted in the frame.

In some examples, a sensor of the one or more sensors comprises a force sensor, such as a load cell or the like, that senses a force acting on a sensing surface of the force sensor.

In some examples, a sensor of the one or more sensors comprises a pressure sensor that senses a pressure acting on a sensing surface of the pressure sensor.

In some examples, a sensor of the one or more sensors comprises a stressed member, such as a diaphragm or a cantilevered beam, integral to the frame 102 and strain gauges operatively connected to a surface of the stressed member.

In some examples, a mix of sensor types are used.

In some examples, the one or more sensors are mounted on a temple piece of the head-worn AR system and have respective sensing surfaces aligned with a temple hinge leaf surface of the temple piece. When a corresponding hinge is closed, a respective frame hinge leaf surface impinges on respective sensing surfaces of the one or more sensors.

In some examples, a portion of the one or more sensors are mounted on a frame of the AR system and a portion of the one or more sensors are mounted on a temple piece of the AR system.

In some examples, one or more sensors are mounted on an inner portion of the frame 102. In some examples, on or more sensors are mounted on a middle portion of the frame 102.

Figure 5:
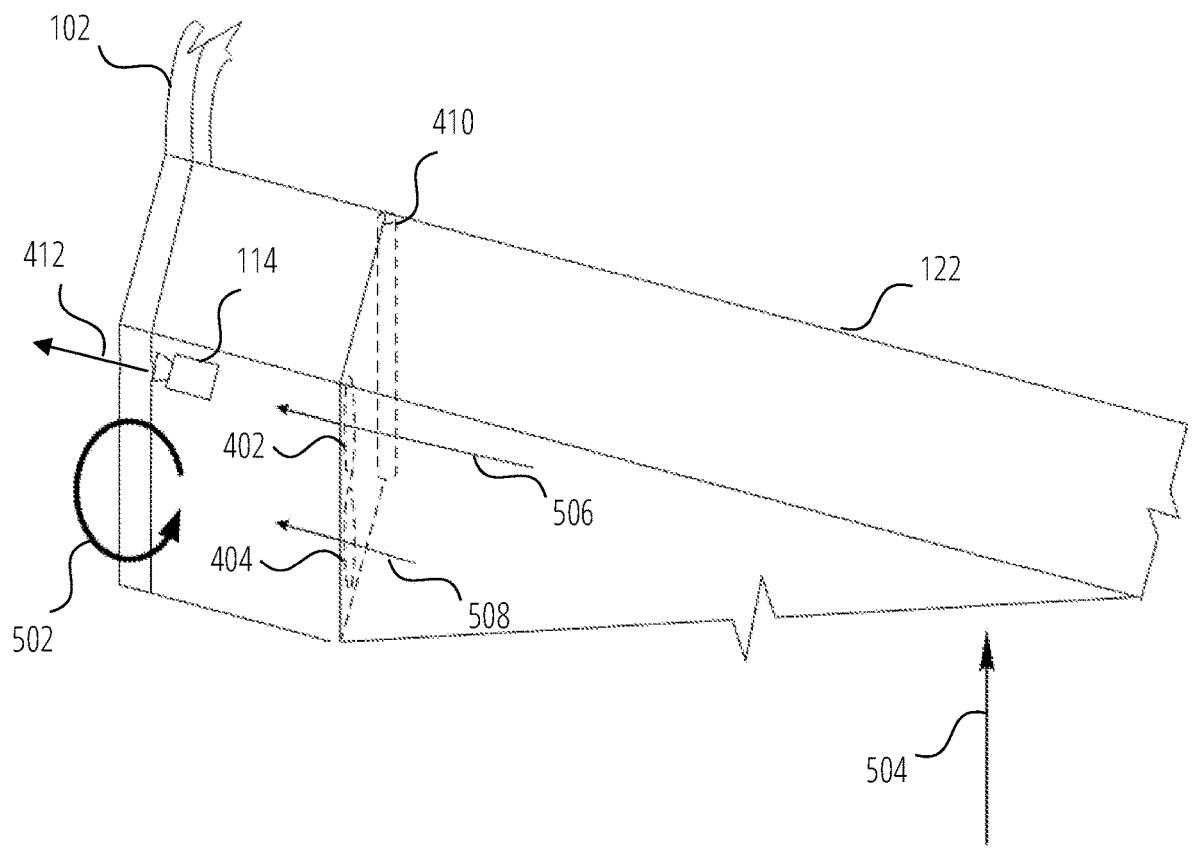
FIG. 5 is an illustration of a sensor arrangement on a frame of a head-worn AR system during vertical loading by a temple piece attached to the frame, according to some examples.

FIG. 5 is an illustration of a sensor arrangement on a frame 102 of a head-worn AR system, such as glasses 100, during vertical loading by a temple piece 122 attached to the frame 102, according to some examples. When a force or pressure is acting in a vertical direction on the left temple piece 122, such as vertical force 504, the vertical force 504 causes unequal forces to act on the upper sensor 402 and the lower sensor 404. For example, when the vertical force 504 acts on the left temple piece 122, the left temple piece 122 behaves like a first lever arm of a lever having a fulcrum at the left hinge spine 410, causing the temple hinge leaf surface 408 to apply unequal forces or pressures to the sensing surfaces of the upper sensor 402 and the lower sensor 404. The unequal forces result in the frame 102 experiencing a pitch movement 502. The pitch movement 502 results in a change in a pitch angle of the left imaging device 114 and an optical axis 412 of the left imaging device 114.

In some examples, in a case where the vertical force is upward, the upper sensor 402 will experience a higher upper sensor force or pressure 506 than a lower sensor force or pressure 508 experienced by the lower sensor 404. In a case where the vertical force is downward, the upper sensor 402 will experience a lower upper sensor force or pressure 506 than a lower sensor force or pressure 508 experienced by the lower sensor 404.

In some examples, a direction of the pitch movement 502 is determined by determining a value of a force or pressure difference resulting from subtracting a value of the lower sensor force or pressure 508 captured by the lower sensor 404 from a value of the upper sensor force or pressure 506 captured by the upper sensor 402. If the resultant value is greater than zero, then the pitch movement 502 is in a downward direction (i.e., a change in a pitch angle of the optical axis 412 of the left imaging device 114 is a negative value). In a similar fashion, if the resultant value is less than zero, then the pitch movement 502 is in an upward direction, (i.e., a change in a pitch angle of the optical axis 412 of the left imaging device 114 is a positive value).

In some examples, a magnitude of a change in a pitch angle of the optical axis 412 of the left imaging device 114 is determined based on an absolute value of a force or pressure difference between a value of the upper sensor force or pressure 506 captured by the upper sensor 402 and a value of the lower sensor force or pressure 508 captured by the lower sensor 404.

In some examples, a right portion of the frame 102 and the right temple piece 124 of glasses 100 include a similar sensor and hinge arrangement as the frame 102 and left temple piece 122. Accordingly, a direction and magnitude of a pitch movement can be determined based on a value of a lower sensor force or pressure captured by a lower right sensor (not shown) and a value of an upper sensor force or pressure captured by an upper right sensor (not shown). In some examples, a magnitude of a change in a pitch angle of an optical axis of the right imaging devices 116 is determined based on an absolute value of a force or pressure difference between a value of an upper sensor force or pressure captured by the upper right sensor and a value of a lower sensor force or pressure captured by the lower right sensor.

Figure 6:
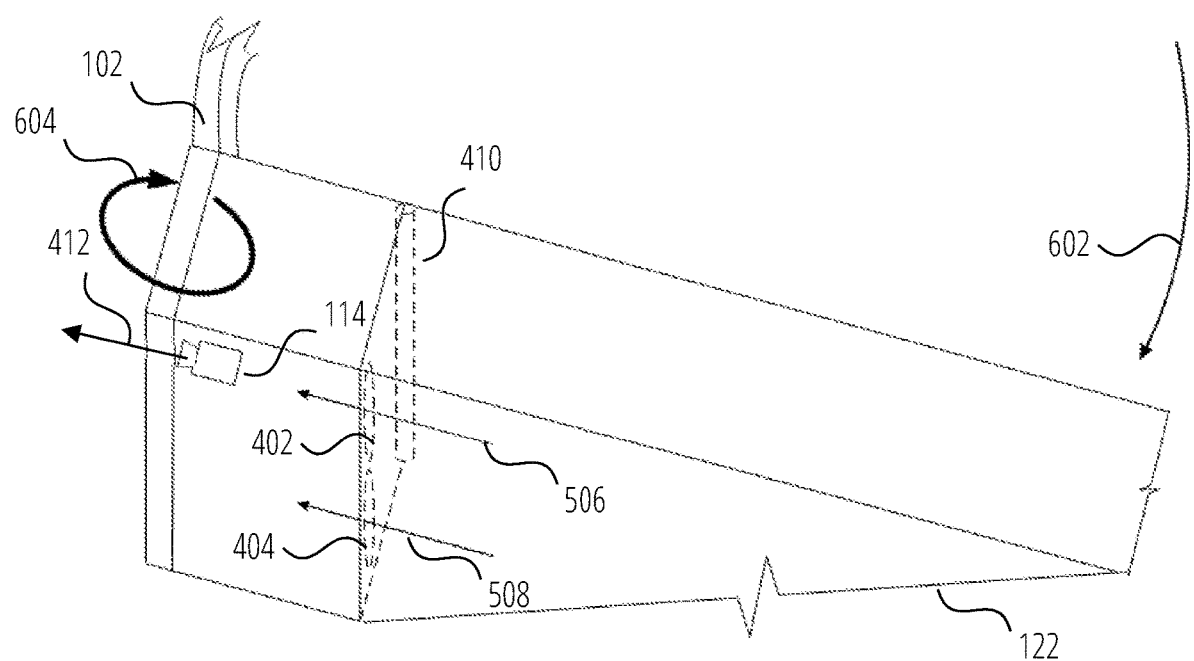
FIG. 6 is an illustration of a sensor arrangement on a frame of a head-worn AR system, during lateral loading of a temple piece attached to the frame, according to some examples.

FIG. 6 is an illustration of a sensor arrangement on a frame 102 of a head-worn AR system, such as glasses 100, during lateral loading of a temple piece 122 attached to the frame 102, according to some examples. When a force or pressure is acting in a lateral direction on the left temple piece 122, such as lateral force 602, and the frame 102 is prevented from rotating, such as by an opposing lateral force acting on a right temple piece (not shown) attached to the frame 102, the lateral force 602 causes an upper sensor force or pressure 506 and a lower sensor force or pressure 508 to act on the upper sensor 402 and the lower sensor 404, respectively. Such opposing lateral forces can occur when a user wears the head-worn AR system. For example, when the lateral force 602 acts on the left temple piece 122, the left temple piece 122 behaves like a first lever arm of a lever having a fulcrum at the left hinge spine 410, causing the temple hinge leaf surface 408 to apply force or pressure to the sensing surfaces of the upper sensor 402 and the lower sensor 404. This results in a torquing force around a vertical axis of the left hinge spine 410 that causes a left portion of the frame 102 to experience a yaw motion 604 as the frame 102 deforms or bends in response to the lateral force acting on the left temple piece 122. The yaw motion 604 results in a change in a yaw angle of the left imaging device 114 and the optical axis 412.

In some examples, a magnitude of a change in a yaw angle of the optical axis 412 of the left imaging device 114 is determined based on a summation of a value of the upper sensor force or pressure 506 captured by the upper sensor 402, a value of the lower sensor force or pressure 508 captured by the lower sensor 404, and a physical model of the frame 102 that includes a value for a stiffness of the frame 102 and a length of the frame 102.

In some examples, a magnitude of a yaw force or pressure of the frame 102 is determined based on a summation of a value of the upper sensor force or pressure 506 captured by the upper sensor 402 and a value of the lower sensor force or pressure 508 captured by the lower sensor 404.

In some examples, a right portion of the frame 102 and the right temple piece 124 of glasses 100 include a similar sensor and hinge arrangement as the frame 102 and left temple piece 122. Accordingly, a magnitude of a yaw force or pressure on the frame 102 is determined based on a summation of a value of an upper sensor force or pressure captured by an upper right sensor (not shown) and a value of a lower sensor force or pressure captured by the lower right sensor (not shown).

Figure 7A:
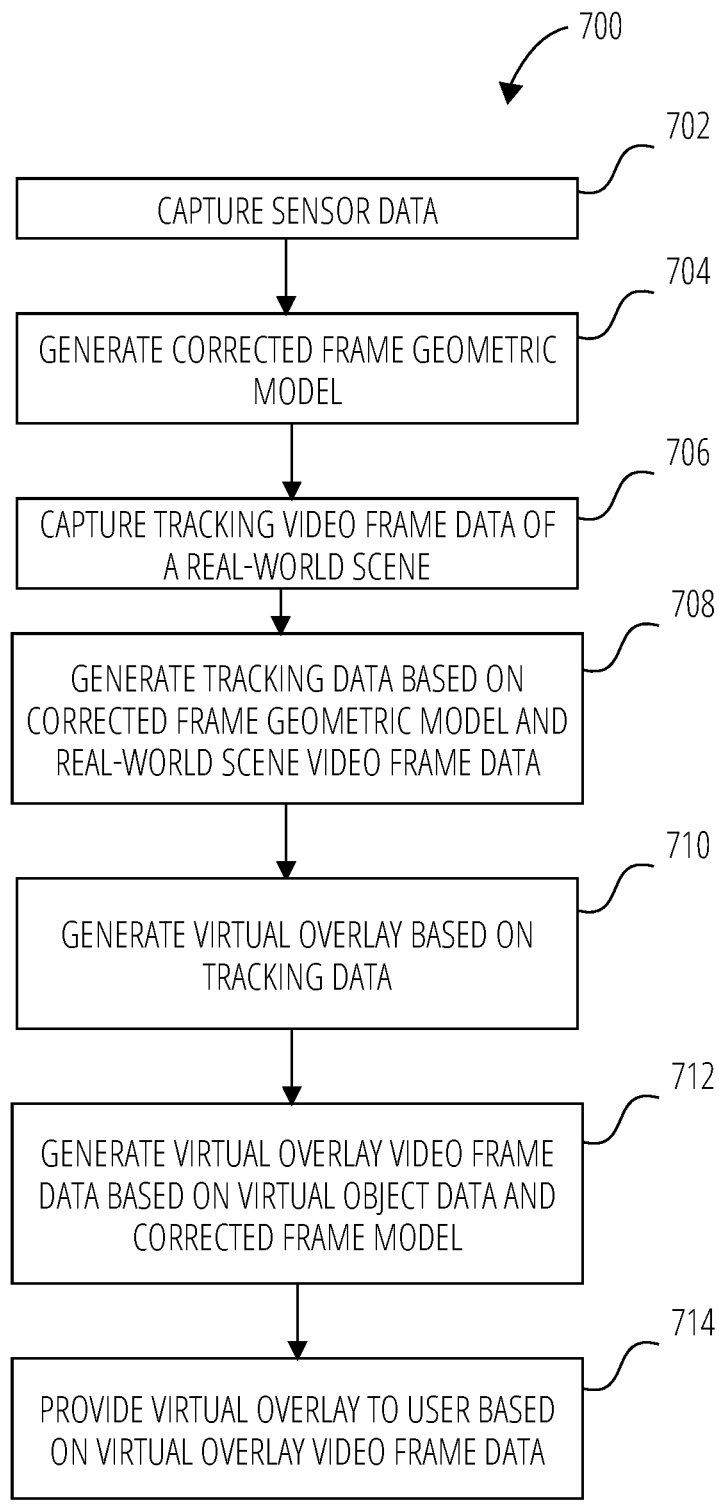
FIG. 7A is a flowchart of a frame bending correction method used by a head-worn AR system according to some examples.
Figure 7B:
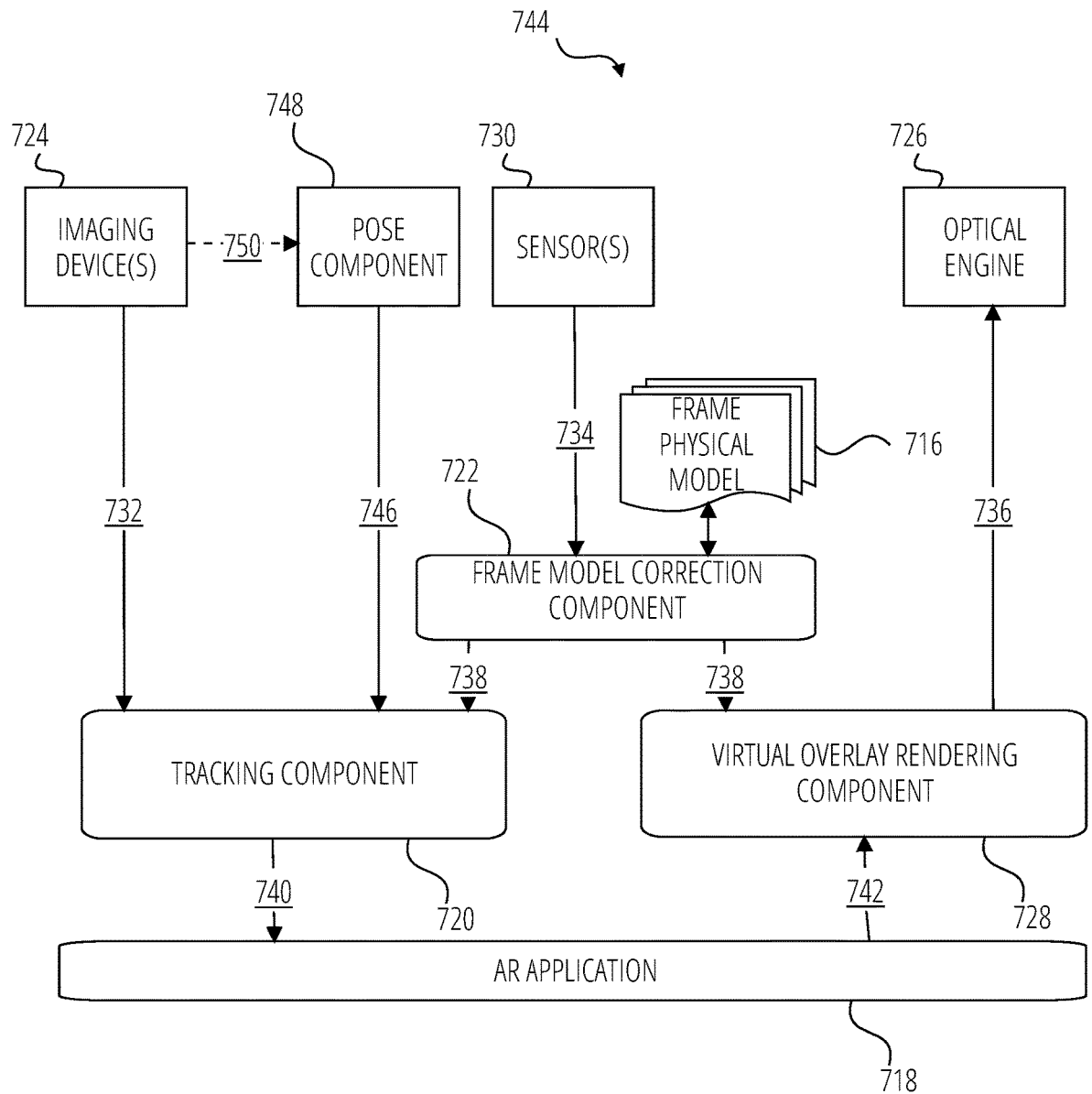
FIG. 7B is a collaboration diagram of components of an AR system according to some examples.

FIG. 7A is a flowchart of a frame bending correction method 700 used by a head-worn AR system, such as glasses 100, to correct for bending of a frame, such as frame 102, of the AR system, and FIG. 7B is a collaboration diagram 744 of components of an AR system according to some examples. The AR system uses the components illustrated in the collaboration diagram 744 to perform the frame bending correction method 700 to generate tracking data 740 and virtual overlay video frame data 736 for an AR application 718.

In operation 702, the AR system captures sensor data 734 from one or more sensors 730, such as one or more of an upper sensor 402, a lower sensor 404, an upper right sensor, and a lower right sensor, mounted on the frame 102 of the glasses 100. The sensor data 734 includes data of measured values of forces or pressure acting on the one or more sensors 730 by a respective left temple piece 122 or a right temple piece 124 as a user wears the head-worn AR system.

In operation 704, the AR system uses a frame model correction component 722 to generate corrected frame model data 738 based on the sensor data 734 and a frame physical model 716. The frame physical model 716 includes data of a frame model comprising a geometric model of the frame that defines locations and geometric relationships between various components of the frame 102. For example, the frame physical model 716 includes data of geometric relationships between the one or more imaging devices 724, such as left imaging device 114 and right imaging device 116 of glasses 100. The frame physical model 716 also includes data of locations and geometric relationships between components of an optical engine 726, such as a left projector 212 and a left optical element 108 of glasses 100, and data of locations and geometric relationships between a right projector 204 and a right optical element 110 of glasses 100. The frame physical model 716 also includes data of locations and geometric relationships of devices comprising a pose components such as one or more IMUs, a GPS sensor, and the like. The frame physical model 716 also includes data of frame flexural rigidity values or stiffness values of the frame 102 at various positions along the frame, such as the flexural rigidity of the frame when yaw bending forces and pitch movement forces act on the frame 102 by the left temple piece 122 and the right temple piece 124 of glasses 100.

In some examples, the data of the frame physical model 716, including the frame flexural rigidity values and the frame model, are generated from a finite element analysis of a frame as designed. In some examples, the data of the frame physical model 716, including the frame flexural rigidity values and the frame model, are determined through testing and calibration of the frame as constructed. In some examples, the data of the frame physical model 716, including the frame flexural rigidity values and the frame model, are generated from a combination of finite element analysis of the frame as designed and testing and calibration of the frame as constructed.

The frame model correction component 722 generates the corrected frame model data 738 by calculating bending of the frame 102 using the data of values of forces or pressure acting on the one more sensors 730 included in the sensor data 734 and the data of the frame flexural rigidity values of the frame physical model 716. The corrected frame model data 738 includes data of corrected geometric relationships of components of the glasses 100. In some examples, the corrected frame model data 738 includes data of corrected geometric relationships between the one or more imaging devices 724, such as the left imaging device 114 and right imaging device 116 of glasses 100 as the frame 102 experiences the measured forces or pressure. In some examples, the corrected frame model data 738 includes data of corrected geometric relationships between the left projector 212 and the left optical element 108, and data of a corrected geometric relationship of a right projector 204 and a right optical element 110 of glasses 100. In some examples, the corrected frame model data 738 includes data of corrected geometric relationships between components of the frame 102 and devices comprising a pose component, such as one or more IMUs 134, a GPS sensor 136, or the like.

In some examples, the frame physical model 716 includes functions that are used to calculate corrected spatial relationships between two or more components of the frame 102 based on the sensor data 734. For example, the two or more components can include any combination of frame components, such as one or more imaging devices, one or more IMUs, one or more projectors, one or more optical elements, one or more GPS sensors, and the like. In some examples, the functions are encoded in the frame physical model 716.

In operation 706, the AR system uses one or more imaging devices 724 to capture tracking video frame data 732 of a real-world scene being viewed by the user of the AR system and uses a pose component 748 to capture pose and location data 746 of the frame 102. The tracking video frame data 732 includes video frame data of physical objects in the real-world scene being viewed by a user of the AR system. The pose and location data 746 includes pose data of the frame 102 including an orientation of the frame 102 and location information of the frame.

In some examples, the pose component 748 comprises one or more IMUs 134. The pose component 748 uses the one or more IMUs 134 to generate inertial motion data. The pose component 748 generates the pose and location data 746 based on the inertial motion data. In some examples, the pose component 748 receives tracking video frame data 750 from the imaging devices 724 and uses the inertial motion data from the one or more IMUs 134 of the frame 102 and generates the pose and location data 746 based on the tracking video frame data 732 and the inertial motion data using Visual Inertial Odometry (VIO) methodologies. In some examples, the pose component includes a GPS sensor that generates GPS location data. The pose component 748 generates the pose and location data 746 partially based on the GPS location data.

In operation 708, the AR system uses a tracking component 720 to generate tracking data 740 based on the corrected frame model data 738, the tracking video frame data 732, and the pose and location data 746. For example, the tracking component 720 extracts features of physical objects in the tracking video frame data 732. In some examples, the tracking component 720 extracts the features from the tracking video frame data 732 using computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like.

The tracking component 720 determines a relative distance between the features extracted from the tracking video frame data 732 and the frame 102 of the AR system based on the tracking video frame data 732 and the corrected frame model data 738. For example, when two imaging devices are used to capture the tracking video frame data 732, a distance between the imaging devices as mounted on the frame 102 and an angle of an optical axis of the two imaging devices is determined based on the corrected frame model data 738. The distance between the frame 102 and a feature can be determined by triangulation based on the distance between the imaging devices and the tracking video frame data 732. The corrected frame model data 738 includes corrected distances between imaging devices mounted on the frame and corrected optical axis angles of the imaging devices. Using the corrected distances and optical axis angles of the imaging devices reduces errors in the determined distances from the features to the frame 102 of the AR system. The AR system maps the features into a 3D model of the real-world scene in accordance with a 3D coordinate system, such as a 3D cartesian coordinate system or a 3D polar coordinate system, based on the pose and location data 746 and the relative distances between the frame 102 and the mapped features.

In some examples, when one imaging device is used to capture the tracking video frame data 732, a relative distance between the feature and the frame 102 can be determined using an angle of an optical axis of the imaging device and an assumed physical size of the feature.

In operation 710, an AR application 718 of the AR system generates virtual overlay data 742 using the tracking data 740. The virtual overlay data 742 includes data of virtual objects generated by the AR application 718 that are used to create a virtual overlay that is provided to the user of the AR system using the optical engine 726. The virtual objects are mapped into the 3D model of the real-world scene using the tracking data 740 such that when the virtual objects rendered into video frame data are provided to the user in a display by the optical engine 726, the virtual objects will appear to be located in the real-world scene in specified relationships to the features of physical objects recognized in the tracking data 740. For example, a virtual overlay may include a user interface composed of virtual objects that the user interacts with using the user's hands. The virtual objects will appear in the virtual overlay in apparent locations near a location of the user's hands as determined from the tracking data 740 such that the user can reach out and interact with the virtual objects.

In operation 712, a virtual overlay rendering component 728 of the AR system generates virtual overlay video frame data 736 using the virtual overlay data 742 and the corrected frame model data 738 by rendering the virtual objects of the virtual overlay into video frame data. The virtual overlay video frame data 736 will be provided to the user in a display by the optical engine 726. The optical engine 726 includes projectors, such as left projector 212 and right projector 204 of glasses 100 to project images of the virtual overlay video frame data 736 onto optical elements, such as left optical element 108 and right optical element 110 of glasses 100. When forces or pressure act upon the temple pieces and frame of the glasses 100, misalignments can occur. The virtual overlay rendering component 728 uses the corrected frame model data 738 to correct the video frame data generated by rendering the virtual objects of the virtual overlay data 742 to account for the misalignments between the projectors and the optical elements of glasses 100.

In operation 714, the AR system uses the optical engine 726 to provide the virtual overlay to the user based on the virtual overlay video frame data 736. For example, one or more projectors of glasses 100 project images included in the virtual overlay video frame data 736 on to one more optical elements of glasses 100 and the user can see the virtual overlay overlaid a real-world scene viewable by the user through the optical elements.

Figure 8:
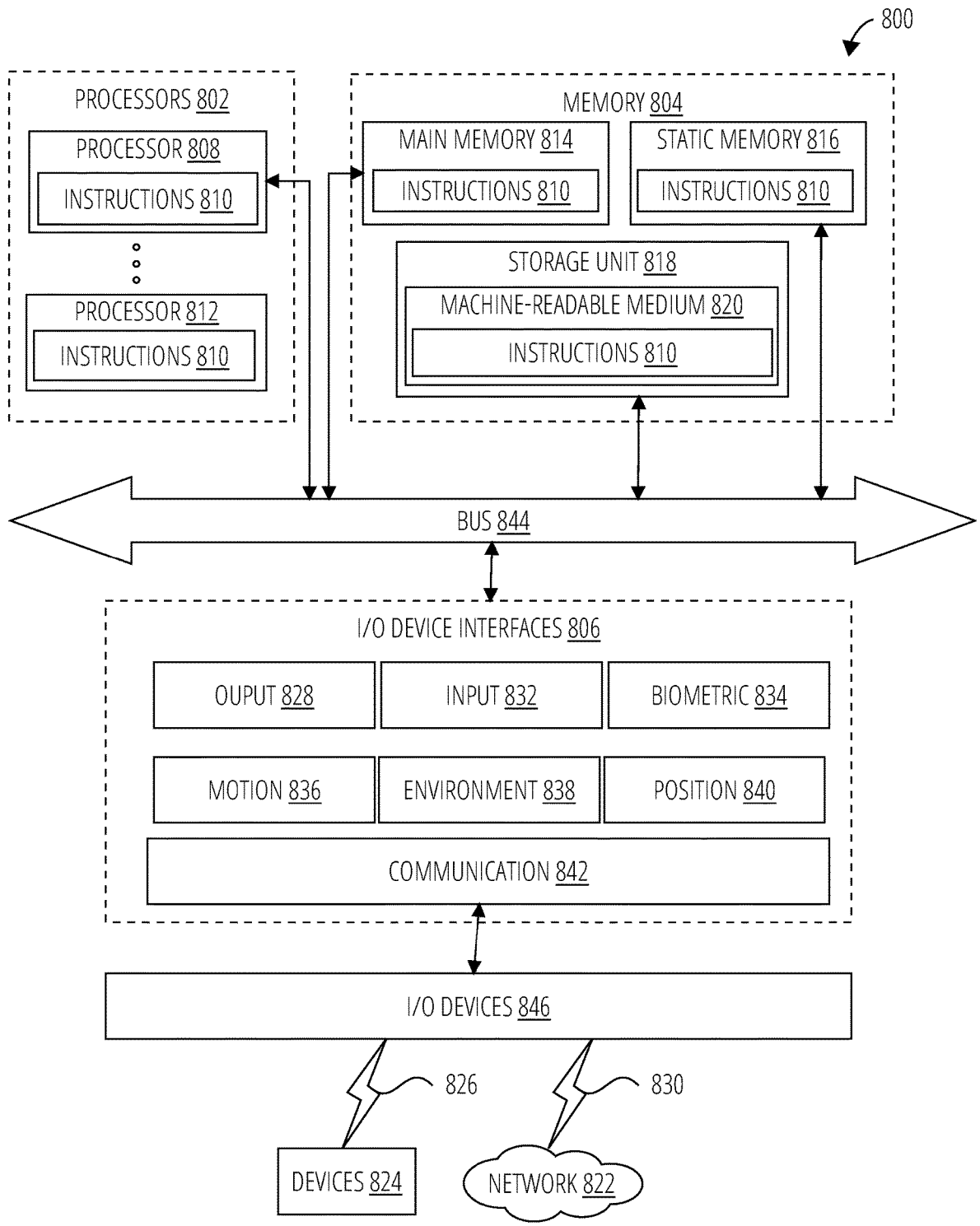
FIG. 8 is a diagrammatic representation of a machine within which a set of instructions may be executed for causing the machine to perform any one or more of the methodologies discussed herein in accordance with some examples.

FIG. 8 is a diagrammatic representation of a machine 800 within which instructions 810 (e.g., software, a program, an application, an applet, an app, or other executable code) for causing the machine 800 to perform any one or more of the methodologies discussed herein may be executed. The machine 800 may be utilized as a computer 120 of an AR system such as glasses 100 of FIG. 1. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 in conjunction with other components of the AR system may function as, but not is not limited to, a server, a client, computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while a single machine 800 is illustrated, the term "machine" may also be taken to include a collection of machines that individually or jointly execute the instructions 810 to perform any one or more of the methodologies discussed herein.

The machine 800 may include processors 802, memory 804, and I/O device interfaces 806, which may be configured to communicate with one another via a bus 844. In an example, the processors 802 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 802, the machine 800 may include a single processor with a single core, a single processor with multiple cores (e.g., a multi-core processor), multiple processors with a single core, multiple processors with multiples cores, or any combination thereof.

The memory 804 includes a main memory 814, a static memory 816, and a storage unit 818, both accessible to the processors 802 via the bus 844. The main memory 804, the static memory 816, and storage unit 818 store the instructions 810 embodying any one or more of the methodologies or functions described herein. The instructions 810 may also reside, completely or partially, within the main memory 814, within the static memory 816, within a non-transitory machine-readable medium 820 within the storage unit 818, within one or more of the processors 802 (e.g., within the processor's cache memory), or any suitable combination thereof, during execution thereof by the machine 800.

The I/O device interfaces 806 couple the machine 800 to I/O devices 846. One or more of the I/O devices 846 may be a component of machine 800 or may be separate devices. The I/O device interfaces 806 may include a wide variety of interfaces to the I/O devices 846 used by the machine 800 to receive input, provide output, produce output, transmit information, exchange information, capture measurements, and so on. The specific I/O device interfaces 806 that are included in a particular machine will depend on the type of machine. It will be appreciated that the I/O device interfaces 806 the I/O devices 846 may include many other components that are not shown in FIG. 8. In various examples, the I/O device interfaces 806 may include output component interfaces 828 and input component interfaces 832. The output component interfaces 828 may include interfaces to visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input component interfaces 832 may include interfaces to alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O device interfaces 806 may include biometric component interfaces 834, motion component interfaces 836, environmental component interfaces 838, or position component interfaces 840, among a wide array of other component interfaces. For example, the biometric component interfaces 834 may include interfaces to components used to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion component interfaces 836 may include interfaces to inertial measurement units (IMUs), acceleration sensor components (e.g., accelerometers), gravitation sensor components, rotation sensor components (e.g., gyroscopes), and so forth. The environmental component interfaces 838 may include, for example, interfaces to illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position component interfaces 840 include interfaces to location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O device interfaces 806 further include communication component interfaces 842 operable to couple the machine 800 to a network 822 or devices 824 via a coupling 830 and a coupling 826, respectively. For example, the communication component interfaces 842 may include an interface to a network interface component or another suitable device to interface with the network 822. In further examples, the communication component interfaces 842 may include interfaces to wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication component interfaces 842 may include interfaces to components operable to detect identifiers. For example, the communication component interfaces 842 may include interfaces to Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication component interfaces 842, such as location via Internet Protocol (IP) geolocation, location via Wi-Fi® signal triangulation, location via detecting an NFC beacon signal that may indicate a particular location, and so forth.

The various memories (e.g., memory 804, main memory 814, static memory 816, and/or memory of the processors 802) and/or storage unit 818 may store one or more sets of instructions and data structures (e.g., software) embodying or used by any one or more of the methodologies or functions described herein. These instructions (e.g., the instructions 810), when executed by processors 802, cause various operations to implement the disclosed examples.

The instructions 810 may be transmitted or received over the network 822, using a transmission medium, via a network interface device (e.g., a network interface component included in the communication component interfaces 842) and using any one of a number of well-known transfer protocols (e.g., hypertext transfer protocol (HTTP)). Similarly, the instructions 810 may be transmitted or received using a transmission medium via the coupling 826 (e.g., a peer-to-peer coupling) to the devices 824.

Figure 9:
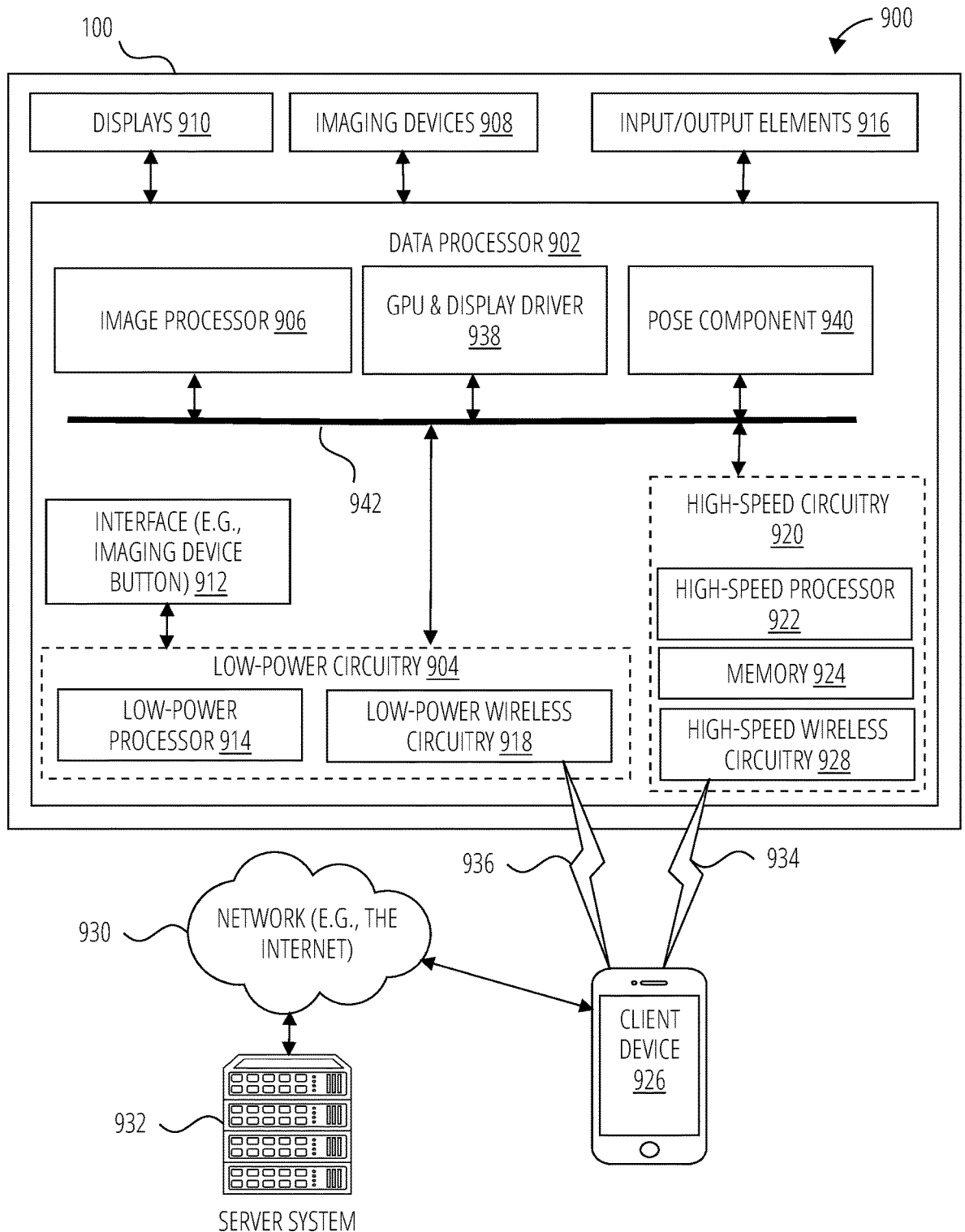
FIG. 9 is a block diagram illustrating a networked system including details of a head-worn AR system, in accordance with some examples.

FIG. 9 is a block diagram illustrating a networked system 900 including details of the glasses 100, in accordance with some examples. The networked system 900 includes the glasses 100, a client device 926, and a server system 932. The client device 926 may be a smartphone, tablet, phablet, laptop computer, access point, or any other such device capable of connecting with the glasses 100 using a low-power wireless connection 936 and/or a high-speed wireless connection 934. The client device 926 is connected to the server system 932 via the network 930. The network 930 may include any combination of wired and wireless connections. The server system 932 may be one or more computing devices as part of a service or network computing system. The client device 926 and any elements of the server system 932 and network 930 may be implemented using details of the software architecture 1004 or the machine 800 described in FIG. 10 and FIG. 8 respectively.

The glasses 100 include a data processor 902, displays 910, one or more imaging devices 908, and additional input/output elements 916. The input/output elements 916 may include microphones, audio speakers, biometric sensors, additional sensors, pressure or force sensors, or additional display elements integrated with the data processor 902. Examples of the input/output elements 916 are discussed further with respect to FIG. 10 and FIG. 8. For example, the input/output elements 916 may include any of I/O device interfaces 806 including output component interfaces 828, motion component interfaces 836, and so forth. Examples of the displays 910 are discussed in FIG. 2. In the particular examples described herein, the displays 910 include a display for the user's left and right eyes.

The data processor 902 includes an image processor 906 (e.g., a video processor), a GPU & display driver 938, a pose component 940, an interface 912, low-power circuitry 904, and high-speed circuitry 920. The components of the data processor 902 are interconnected by a bus 942.

The interface 912 refers to any source of a user command that is provided to the data processor 902. In one or more examples, the interface 912 is a physical button that, when depressed, sends a user input signal from the interface 912 to a low-power processor 914. A depression of such button followed by an immediate release may be processed by the low-power processor 914 as a request to capture a single image, or vice versa. A depression of such a button for a first period of time may be processed by the low-power processor 914 as a request to capture video data while the button is depressed, and to cease video capture when the button is released, with the video captured while the button was depressed stored as a single video file. Alternatively, depression of a button for an extended period of time may capture a still image. In some examples, the interface 912 may be any mechanical switch or physical interface capable of accepting user inputs associated with a request for data from the imaging devices 908. In other examples, the interface 912 may have a software component, or may be associated with a command received wirelessly from another source, such as from the client device 926.

The image processor 906 includes circuitry to receive signals from the imaging devices 908 and process those signals from the imaging devices 908 into a format suitable for storage in the memory 924 or for transmission to the client device 926. In one or more examples, the image processor 906 (e.g., video processor) comprises a microprocessor integrated circuit (IC) customized for processing sensor data from the imaging devices 908, along with volatile memory used by the microprocessor in operation.

The low-power circuitry 904 includes the low-power processor 914 and the low-power wireless circuitry 918. These elements of the low-power circuitry 904 may be implemented as separate elements or may be implemented on a single IC as part of a system on a single chip. The low-power processor 914 includes logic for managing the other elements of the glasses 100. As described above, for example, the low-power processor 914 may accept user input signals from the interface 912. The low-power processor 914 may also be configured to receive input signals or instruction communications from the client device 926 via the low-power wireless connection 936. The low-power wireless circuitry 918 includes circuit elements for implementing a low-power wireless communication system. Bluetooth™ Smart, also known as Bluetooth™ low energy, is one standard implementation of a low power wireless communication system that may be used to implement the low-power wireless circuitry 918. In other examples, other low power communication systems may be used.

The high-speed circuitry 920 includes a high-speed processor 922, a memory 924, and a high-speed wireless circuitry 928. The high-speed processor 922 may be any processor capable of managing high-speed communications and operation of any general computing system used for the data processor 902. The high-speed processor 922 includes processing resources used for managing high-speed data transfers on the high-speed wireless connection 934 using the high-speed wireless circuitry 928. In some examples, the high-speed processor 922 executes an operating system such as a LINUX operating system or other such operating system such as the operating system 1012 of FIG. 10. In addition to any other responsibilities, the high-speed processor 922 executing a software architecture for the data processor 902 is used to manage data transfers with the high-speed wireless circuitry 928. In some examples, the high-speed wireless circuitry 928 is configured to implement Institute of Electrical and Electronic Engineers (IEEE) 802.11 communication standards, also referred to herein as Wi-Fi. In other examples, other high-speed communications standards may be implemented by the high-speed wireless circuitry 928.

The memory 924 includes any storage device capable of storing imaging device data generated by the imaging devices 908 and the image processor 906. While the memory 924 is shown as integrated with the high-speed circuitry 920, in other examples, the memory 924 may be an independent standalone element of the data processor 902. In some such examples, electrical routing lines may provide a connection through a chip that includes the high-speed processor 922 from image processor 906 or the low-power processor 914 to the memory 924. In other examples, the high-speed processor 922 may manage addressing of the memory 924 such that the low-power processor 914 will boot the high-speed processor 922 any time that a read or write operation involving the memory 924 is desired.

The pose component 940 estimates a physical orientation or pose of the glasses 100. For example, the pose component 940 uses image data from the imaging devices 908 and associated inertial data captured using the position component interfaces 840, as well as GPS location data, to track a location and determine a pose of the glasses 100 relative to a frame of reference (e.g., real-world scene). The pose component 940 continually gathers and uses updated sensor data describing movements of the glasses 100 to determine updated three-dimensional poses of the glasses 100 that indicate changes in the relative position and orientation relative to physical objects in the real-world scene. The pose component 940 permits visual placement of virtual objects relative to physical objects by the glasses 100 within the field of view of the user via the displays 910.

The GPU & display driver 938 may use the pose of the glasses 100 to generate frames of virtual content or other content to be presented on the displays 910 when the glasses 100 are functioning in an augmented reality mode. In this mode, the GPU & display driver 938 generates updated frames of virtual content based on updated three-dimensional poses of the glasses 100, which reflect changes in the position and orientation of the user in relation to physical objects in the user's real-world scene.

One or more functions or operations described herein may also be performed in an application resident on the glasses 100 or on the client device 926, or on a remote server. For example, one or more functions or operations described herein may be performed by one of the applications 1006 such as messaging application 1046.

Figure 10:
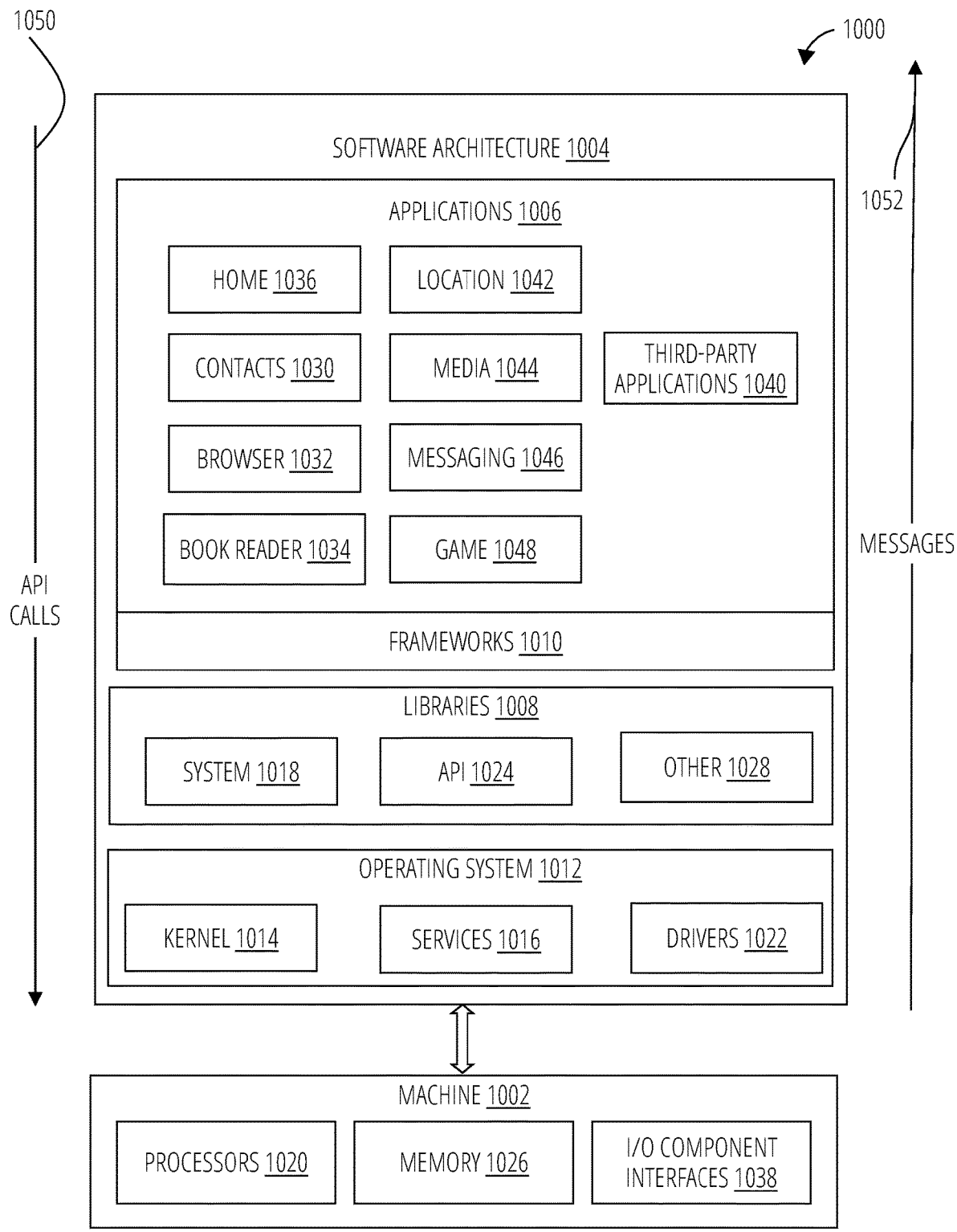
FIG. 10 is a block diagram showing a software architecture within which the present disclosure may be implemented, in accordance with some examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O component interfaces 1038. In this example, the software architecture 1004 can be conceptualized as a stack of layers, where individual layers provide a particular functionality. The software architecture 1004 includes layers such as an operating system 1012, libraries 1008, frameworks 1010, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionalities. The services 1016 can provide other common services for the other software layers. The drivers 1022 are responsible for controlling or interfacing with the underlying hardware. For instance, the drivers 1022 can include display drivers, imaging device drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1008 provide a low-level common infrastructure used by the applications 1006. The libraries 1008 can include system libraries 1018 (e.g., C standard library) that provide functions such as memory allocation functions, string manipulation functions, mathematic functions, and the like. In addition, the libraries 1008 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g. OpenIMAJ), database libraries (e.g., SQLite to provide various relational database functions), web libraries (e.g., WebKit to provide web browsing functionality), and the like. The libraries 1008 can also include a wide variety of other libraries 1028 to provide many other APIs to the applications 1006.

The frameworks 1010 provide a high-level common infrastructure that is used by the applications 1006. For example, the frameworks 1010 provide various graphical user interface (GUI) functions, high-level resource management, and high-level location services. The frameworks 1010 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as third-party applications 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party applications 1040 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system.

In this example, the third-party applications 1040 can invoke the API calls 1050 provided by the operating system 1012 to facilitate functionality described herein.

Figure 11:
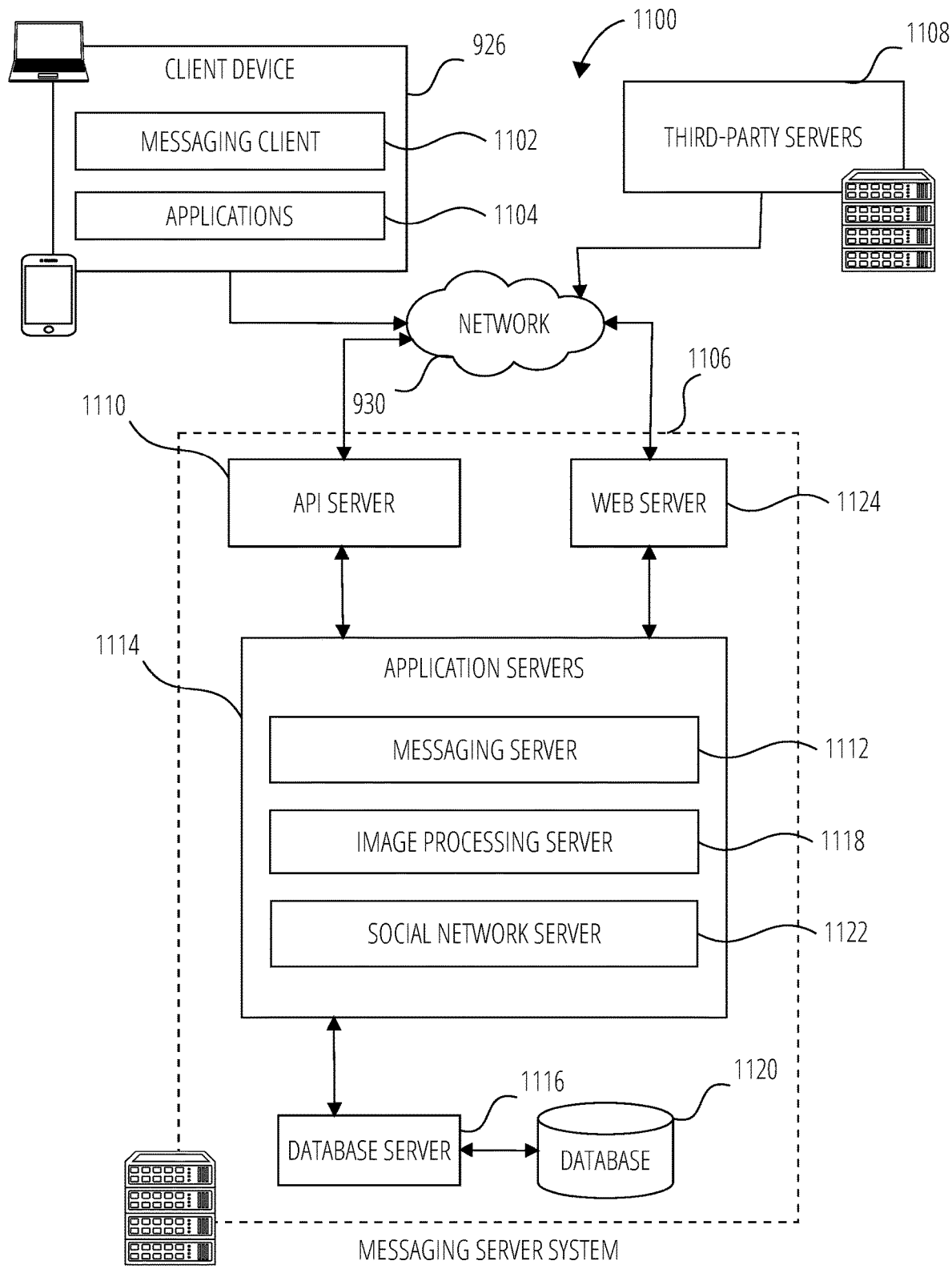
FIG. 11 is a block diagram showing an example messaging system for exchanging data (e.g., messages and associated content) over a network in accordance with some examples

FIG. 11 is a block diagram showing an example messaging system 1100 for exchanging data (e.g., messages and associated content) over a network. The messaging system 1100 includes multiple instances of a client device 926 which host a number of applications, including a messaging client 1102 and other applications 1104. A messaging client 1102 is communicatively coupled to other instances of the messaging client 1102 (e.g., hosted on respective other client devices 926), a messaging server system 1106 and third-party servers 1108 via a network 930 (e.g., the Internet). A messaging client 1102 can also communicate with locally hosted applications 1104 using Application Program Interfaces (APIs).

A messaging client 1102 is able to communicate and exchange data with other messaging clients 1102 and with the messaging server system 1106 via the network 930. The data exchanged between messaging clients 1102, and between a messaging client 1102 and the messaging server system 1106, includes functions (e.g., commands to invoke functions) as well as payload data (e.g., text, audio, video or other multimedia data).

The messaging server system 1106 provides server-side functionality via the network 930 to a particular messaging client 1102. While some functions of the messaging system 1100 are described herein as being performed by either a messaging client 1102 or by the messaging server system 1106, the location of some functionality either within the messaging client 1102 or the messaging server system 1106 may be a design choice. For example, it may be technically preferable to initially deploy some technology and functionality within the messaging server system 1106 but to later migrate this technology and functionality to the messaging client 1102 where a client device 926 has sufficient processing capacity.

The messaging server system 1106 supports various services and operations that are provided to the messaging client 1102. Such operations include transmitting data to, receiving data from, and processing data generated by the messaging client 1102. This data may include message content, client device information, geolocation information, media augmentation and overlays, message content persistence conditions, social network information, and live event information, as examples. Data exchanges within the messaging system 1100 are invoked and controlled through functions available via user interfaces (UIs) of the messaging client 1102.

Turning now specifically to the messaging server system 1106, an Application Program Interface (API) server 1110 is coupled to, and provides a programmatic interface to, application servers 1114. The application servers 1114 are communicatively coupled to a database server 1116, which facilitates access to a database 1120 that stores data associated with messages processed by the application servers 1114. Similarly, a web server 1124 is coupled to the application servers 1114, and provides web-based interfaces to the application servers 1114. To this end, the web server 1124 processes incoming network requests over the Hypertext Transfer Protocol (HTTP) and several other related protocols.

The Application Program Interface (API) server 1110 receives and transmits message data (e.g., commands and message payloads) between the client device 926 and the application servers 1114. Specifically, the Application Program Interface (API) server 1110 provides a set of interfaces (e.g., routines and protocols) that can be called or queried by the messaging client 1102 in order to invoke functionality of the application servers 1114. The Application Program Interface (API) server 1110 exposes various functions supported by the application servers 1114, including account registration, login functionality, the sending of messages, via the application servers 1114, from a particular messaging client 1102 to another messaging client 1102, the sending of media files (e.g., images or video) from a messaging client 1102 to a messaging server 1112, and for possible access by another messaging client 1102, the settings of a collection of media data (e.g., story), the retrieval of a list of friends of a user of a client device 926, the retrieval of such collections, the retrieval of messages and content, the addition and deletion of entities (e.g., friends) to an entity graph (e.g., a social graph), the location of friends within a social graph, and opening an application event (e.g., relating to the messaging client 1102).

The application servers 1114 host a number of server applications and subsystems, including for example a messaging server 1112, an image processing server 1118, and a social network server 1122. The messaging server 1112 implements a number of message processing technologies and functions, particularly related to the aggregation and other processing of content (e.g., textual and multimedia content) included in messages received from multiple instances of the messaging client 1102. As will be described in further detail, the text and media content from multiple sources may be aggregated into collections of content (e.g., called stories or galleries). These collections are then made available to the messaging client 1102. Other processor and memory intensive processing of data may also be performed server-side by the messaging server 1112, in view of the hardware requirements for such processing.

The application servers 1114 also include an image processing server 1118 that is dedicated to performing various image processing operations, typically with respect to images or video within the payload of a message sent from or received at the messaging server 1112.

The social network server 1122 supports various social networking functions and services and makes these functions and services available to the messaging server 1112. To this end, the social network server 1122 maintains and accesses an entity graph within the database 1120. Examples of functions and services supported by the social network server 1122 include the identification of other users of the messaging system 1100 with which a particular user has relationships or is "following," and also the identification of other entities and interests of a particular user.

The messaging client 1102 can notify a user of the client device 926, or other users related to such a user (e.g., "friends"), of activity taking place in shared or shareable sessions. For example, the messaging client 1102 can provide participants in a conversation (e.g., a chat session) in the messaging client 1102 with notifications relating to the current or recent use of a game by one or more members of a group of users. One or more users can be invited to join in an active session or to launch a new session. In some examples, shared sessions can provide a shared augmented reality experience in which multiple people can collaborate or participate.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "machine-readable medium" refers to both machine-storage media and transmission media. Thus, the terms include both storage devices/media and carrier waves/modulated data signals. The terms "machine-readable medium," "machine-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer-implemented method, comprising:
capturing, by one or more processors, using one or more sensors of an Augmented Reality (AR) system, sensor data of forces acting on a frame of the AR system, the one or more sensors comprising one or more respective sensing surfaces aligned with a temple hinge leaf surface of a temple piece of the frame;
generating, by the one or more processors, a corrected frame model of the frame based on the sensor data and a physical model of the frame;
capturing, by the one or more processors, using one or more imaging devices mounted on the frame, tracking video frame data of one or more physical objects in a real-world scene viewed by a user of the AR system;
capturing, by the one or more processors, using a pose component of the AR system, pose and location data of the AR system as the AR system is capturing the tracking video frame data; and
generating, by the one or more processors, tracking data based on the corrected frame model, the tracking video frame data, and the pose and location data.

2. The computer-implemented method of claim 1, further comprising:
generating, by the one or more processors, virtual overlay data based on the tracking data;
generating, by the one or more processors, virtual overlay video frame data based on the corrected frame model and the virtual overlay data; and providing, by the one or more processors, using an optical engine of the AR system, a virtual overlay to the user based on the virtual overlay video frame data.

3. The computer-implemented method of claim 1, wherein the one or more sensors are mounted in the temple piece.

4. The computer-implemented method of claim 1, wherein the one or more sensors comprise at least two sensors mounted in a vertically spaced apart arrangement.

5. The computer-implemented method of claim 1, wherein a frame hinge leaf of the frame impinges on the one or more sensing surfaces.

6. The computer-implemented method of claim 5, wherein a surface of the frame hinge leaf includes respective one or more protuberances that impinge on the one or more sensing surfaces.

7. The computer-implemented method of claim 1, wherein the AR system comprises a head-worn AR system.

8. A machine comprising:
at least one processor; and
at least one memory storing instructions that, when executed by the at least one processor, cause the machine to perform operations comprising:
capturing, by one or more processors, using one or more sensors of an Augmented Reality (AR) system, sensor data of forces acting on a frame of the AR system, the one or more sensors comprising one or more respective sensing surfaces aligned with a temple hinge leaf surface of a temple piece of the frame;
generating, by the one or more processors, a corrected frame model of the frame based on the sensor data and a physical model of the frame;
capturing, by the one or more processors, using one or more imaging devices mounted on the frame, tracking video frame data of one or more physical objects in a real-world scene viewed by a user of the AR system;
capturing, by the one or more processors, using a pose component of the AR system, pose and location data of the AR system as the AR system is capturing the tracking video frame data; and
generating, by the one or more processors, tracking data based on the corrected frame model, the tracking video frame data, and the pose and location data.

9. The machine of claim 8, wherein the operations further comprise:
generating, by the one or more processors, virtual overlay data based on the tracking data;
generating, by the one or more processors, virtual overlay video frame data based on the corrected frame model and the virtual overlay data; and
providing, by the one or more processors, using an optical engine of the AR system, a virtual overlay to the user based on the virtual overlay video frame data.

10. The machine of claim 8, wherein the one or more sensors are mounted in the temple piece.

11. The machine of claim 8, wherein the one or more sensors comprise at least two sensors mounted in a vertically spaced apart arrangement.

12. The machine of claim 8, wherein a frame hinge leaf of the frame impinges on the one or more sensing surfaces.

13. The machine of claim 12, wherein a surface of the frame hinge leaf includes respective one or more protuberances that impinge on the one or more sensing surfaces.

14. The machine of claim 8, wherein the AR system comprises a head-worn AR system.

15. A machine-storage medium, the machine-storage medium including instructions that, when executed by a machine, cause the machine to perform operations comprising:
capturing, by one or more processors, using one or more sensors of an Augmented Reality (AR) system, sensor data of forces acting on a frame of the AR system, the one or more sensors comprising one or more respective sensing surfaces aligned with a temple hinge leaf surface of a temple piece of the frame;
generating, by the one or more processors, a corrected frame model of the frame based on the sensor data and a physical model of the frame;
capturing, by the one or more processors, using one or more imaging devices mounted on the frame, tracking video frame data of one or more physical objects in a real-world scene viewed by a user of the AR system;
capturing, by the one or more processors, using a pose component of the AR system, pose and location data of the AR system as the AR system is capturing the tracking video frame data; and
generating, by the one or more processors, tracking data based on the corrected frame model, the tracking video frame data, and the pose and location data.

16. The machine-storage medium of claim 15, wherein the operations further comprise:
generating, by the one or more processors, virtual overlay data based on the tracking data;
generating, by the one or more processors, virtual overlay video frame data based on the corrected frame model and the virtual overlay data; and
providing, by the one or more processors, using an optical engine of the AR system, a virtual overlay to the user based on the virtual overlay video frame data.

17. The machine-storage medium of claim 15, wherein the one or more sensors are mounted in the temple piece.

18. The machine-storage medium of claim 15, wherein the one or more sensors comprise at least two sensors mounted in a vertically spaced apart arrangement.

19. The machine-storage medium of claim 15, wherein a frame hinge leaf of the frame impinges on the one or more sensing surfaces.

20. The machine-storage medium of claim 15, wherein the AR system comprises a head-worn AR system.

* * * * *